US007948920B2

(12) United States Patent
Ghosh et al.

(10) Patent No.: US 7,948,920 B2
(45) Date of Patent: May 24, 2011

(54) TRUNKING WITH PORT AGGREGATION FOR FABRIC PORTS IN A FIBRE CHANNEL FABRIC AND ATTACHED DEVICES

(75) Inventors: Kalyan Ghosh, Santa Clara, CA (US); Srinivas Pitta, Cupertino, CA (US); Giuseppe Andreello, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 12/396,760

(22) Filed: Mar. 3, 2009

(65) Prior Publication Data
US 2010/0226281 A1    Sep. 9, 2010

(51) Int. Cl.
*H04L 12/28* (2006.01)
*H04L 12/66* (2006.01)
(52) U.S. Cl. ............................... 370/254; 370/463
(58) Field of Classification Search ............ None
See application file for complete search history.

(56) References Cited

U.S. PATENT DOCUMENTS

| 7,460,527 | B2 | 12/2008 | Ghosh et al. | |
|---|---|---|---|---|
| 2005/0036499 | A1* | 2/2005 | Dutt et al. | 370/401 |
| 2006/0039366 | A1* | 2/2006 | Ghosh et al. | 370/360 |
| 2006/0092932 | A1* | 5/2006 | Ghosh et al. | 370/389 |
| 2007/0130295 | A1* | 6/2007 | Rastogi et al. | 709/220 |
| 2007/0174851 | A1* | 7/2007 | Smart | 719/324 |
| 2008/0316942 | A1 | 12/2008 | Desai et al. | |
| 2010/0085981 | A1* | 4/2010 | Gupta et al. | 370/419 |

* cited by examiner

*Primary Examiner* — Hong Cho
*Assistant Examiner* — Eunsook Choi

(57) ABSTRACT

Trunking with port aggregation for fabric ports in a Fiber Channel (FC) fabric and attached devices is described. In some examples, a method of establishing a connection between a node and the FC fabric includes: negotiating a first link between a first trunking node port in the node with a first trunking fabric port in the FC fabric; creating a trunking port channel with the first link as a first member, the trunking port channel supporting a plurality of virtual fabrics; logging in a logical interface for each of the plurality of virtual fabrics to the FC fabric over the trunking port channel; negotiating a second link between a second trunking node port in the node and a second trunking fabric port in the FC fabric; and adding the second link to the trunking port channel as a second member aggregated with the first member.

20 Claims, 7 Drawing Sheets

FIG. 6     600

TRUNKING WITH PORT AGGREGATION FOR FABRIC PORTS IN A FIBRE CHANNEL FABRIC AND ATTACHED DEVICES

BACKGROUND

1. Field

The following generally relates to Fibre Channel networks and devices, and more particularly, to trunking with port aggregation for fabric ports in a Fibre Channel fabric and attached devices.

2. Related Art

In recent years, the capacity of storage devices has not increased as fast as the demand for storage. Thus, a given server or other host must access multiple, physically distinct storage nodes (e.g., disc drives or disk drive systems). The Storage Area Network (SAN) was developed to solve storage limitations. Generally, a SAN is a high-speed, special-purpose network that interconnects different data storage devices and associated data hosts on behalf of a larger network of users. A SAN may use various types of network traffic, but typically a SAN employs Fibre Channel (FC) frames.

Traditionally, designers of SANs built separate fabrics, referred to as "SAN islands". For example, a business might employ one SAN island for human resource applications, another SAN island for engineering applications, another for marketing, etc. Each SAN island contains a physically isolated switch or group of switches for connecting hosts to storage devices. While this approach may enforce separation and data between various groups in an organization, hardware and management resources are frequently under-utilized.

More recently, some switches, such as the MDS9000 family of switches commercially available from Cisco Systems, Inc. of San Jose, Calif., have provided the capability to deploy virtual SANs ("VSANs"). With this approach, multiple SAN islands may be collapsed to a single physical infrastructure, thereby reducing hardware costs and improving manageability, while maintaining the stability and traffic isolation of the SAN island model. Each VSAN is logically separate and may be assigned to a separate group, e.g., marketing, engineering, etc. In this collapsed fabric model, some or all switches and inter-switch links in the fabric carry traffic for multiple VSANs. Implementation of virtual fabrics is known as "VSAN trunking" or generally "trunking". VSAN trunking allows traffic in multiple VSANs to be transmitted over a single physical link.

Furthermore, neighboring devices in a FC network may be connected through multiple physical links. For example, a host (e.g., a server, storage device, etc.) may be connected to ports on the fabric ("fabric ports") using a plurality of physical links. Conventionally, the protocols are designed such that each link between a host and FC fabric operates independently. Two or more connections to the fabric potentially offer a host much higher total available bandwidth and fault tolerance against link failures (known as "link aggregation"). However, since the links are treated independently, a host must implement complex logic to split the input/output (IO) operations between all available links. Further, the host must implement additional logic to handle the failover between links in the case of link failures. Further, there are no known techniques for implementing the combination of trunking and link aggregation between a host and an FC fabric to which it is attached.

Accordingly, there exists a need in the art for a method and apparatus that provides trunking with port aggregation for fabric ports in a Fibre Channel fabric and attached devices.

BRIEF DESCRIPTION OF THE DRAWINGS

The teachings of the present invention can be readily understood by considering the following detailed description in conjunction with the accompanying drawings.

The figures in the appended drawings, like the detailed description, are examples. As such, the figures and the detailed description are not to be considered limiting, and other equally effective examples are possible and likely. Furthermore, like reference numerals in the figures indicate like elements, and wherein.

DESCRIPTION OF EXAMPLE EMBODIMENTS

Figure 1:
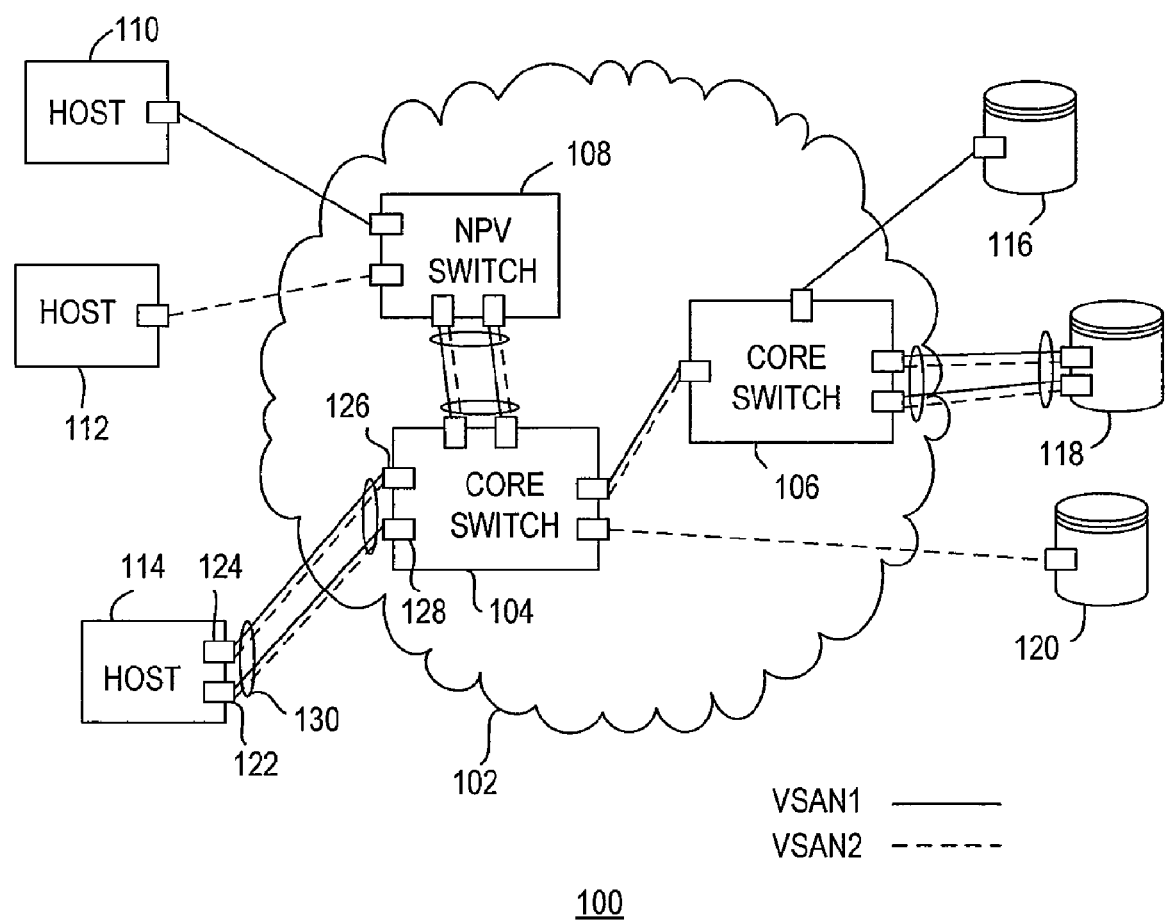
FIG. 1 is a block diagram depicting a storage area network (SAN) according to some embodiments of the invention.

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments and/or examples disclosed are for exemplary purposes only and other embodiments and/or examples may be employed in lieu of or in combination with the embodiments disclosed.

An aspect of the invention relates to a method of establishing a connection between a node and fibre channel (FC) fabric. In some embodiments, the method includes: negotiating a first link between a first trunking node port in the node with a first trunking fabric port in the FC fabric; creating a trunking port channel with the first link as a first member, the trunking port channel supporting a plurality of virtual fabrics; logging in a logical interface for each of the plurality of virtual fabrics to the FC fabric over the trunking port channel; negotiating a second link between a second trunking node port in the node and a second trunking fabric port in the FC fabric; and adding the second link to the trunking port channel as a second member aggregated with the first member.

Another aspect of the invention relates to an FC network device. In some embodiments, the FC network device includes: a first trunking fabric port configured to accept connections from a first trunking node port; a second trunking fabric port configured to accept connections from a second trunking node port; and control logic, coupled to the first trunking fabric port and the second trunking fabric port, configured to: negotiate a first link between the first trunking fabric port and the first trunking node port; create a trunking port channel with the first link as a first member, the trunking port channel supporting a plurality of virtual fabrics; log a logical interface for each of the plurality of virtual fabrics over the trunking port channel; negotiate a second link between the second trunking fabric port and the second trunking node port; and add the second link to the trunking port channel as a second member aggregated with the first member.

Another aspect of the invention relates to a node configured to connect to an FC fabric. In some embodiments, the node includes: a first trunking node port configured to connect to a first trunking fabric port in the FC fabric; a second trunking node port configured to connect to a second trunking fabric port in the FC fabric; and control logic, coupled to the first trunking node port and the second trunking node port, configured to: negotiate a first link between the first trunking node port and the first trunking fabric port; negotiate creation of a trunking port channel with the first link as a first member, the trunking port channel supporting a plurality of virtual fabrics; log in a logical interface for each of the plurality of virtual fabrics to the FC fabric over the trunking port channel; negotiate a second link between the second trunking node port and the second trunking fabric port; and negotiate addition of the second link to the trunking port channel as a second member aggregated with the first member.

Another aspect of the invention relates to a storage area network (SAN). In some embodiments, the SAN includes: a node having a first trunking node port and a second trunking node port; a fibre channel (FC) fabric including network device having a first trunking fabric port and a second trunking fabric port; a first link between the first trunking node port and the first trunking fabric port; a second link between the second trunking node port and the second trunking fabric port; wherein the node and the network device are configured to: create a trunking port channel with the first link as a first member, the trunking port channel supporting a plurality of virtual fabrics; log a logical interface for each of the plurality of virtual fabrics to the FC fabric over the trunking port channel; and add the second link to the trunking port channel as a second member aggregated with the first member.

FIG. 1 is a block diagram depicting a storage area network (SAN) 100 according to some embodiments of the invention. The SAN 100 includes a plurality of nodes coupled to a fabric 102. The nodes include hosts 110, 112, and 114, as well as storage devices 116, 118, and 120. The fabric 102 includes a core switch 104, a core switch 106, and an N-port virtualization (NPV) switch 108. In general, the hosts 110, 112, and 114 communicate with the storage devices 116, 118, and 120 through the fabric 102.

The SAN 100 operates using the Fibre Channel (FC) protocol, which provides communication between nodes using FC frames. Accordingly, the fabric 102 may be an FC fabric. The FC protocol defines different types of ports, including N_Ports, F_Ports, and E_Ports. N_Ports reside on network end or edge nodes, such as hosts, storage devices, edge switches, etc. F_Ports reside on fabric switches and connect to N_Ports to provide links between nodes and switches. N_ports are examples of "node ports," and F_ports are examples of "fabric ports." E_ports are used for links between fabric switches, also known as "inter-switch links" or ISLs. Traffic between N_Ports and F_ports (and potentially between E_ports) can be transmitted in standard FC frame format, referred to as "untagged format."

The fabric 102 of the SAN 100 also supports multiple virtual SANs (VSANs). A VSAN is an example of a "virtual fabric". A virtual fabric is a logically distinct fabric within the fabric 102. Some ports may be "trunking ports" that support traffic for the multiple VSANs. The format of frames transmitted between trunking ports is referred to as "tagged format." The tagged format specifically identifies the VSAN of each frame and thereby allows the logical separation of traffic among the VSANs. An exemplary tagged format that can be used to transmit traffic between trunking ports is known as Extended Inter-Switch Link (EISL) format. The use of EISL format for trunking E_Ports is described in U.S. Patent Publication No. 2003-0118053-A1, published Jun. 26, 2003, which is incorporated by reference herein. Another tagged format that can be used to transmit traffic between trunking ports is known as Extended Link Service (ELS) format. As used herein, trunking N_Ports are referred as TN_ports, and trunking F_ports are referred to as TF_ports.

A "port channel" as used herein refers to a logical interface built on a set of physical links between ports and operating as a single link. An F_Port channel is the logical combination of a plurality of N_Port-F_Port links between devices. A port channel, such as an F_Port channel, is used to implement link aggregation, which provides for seamless fault tolerance and improved bandwidth utilization. The SAN 100 also includes trunking port channels, whereby multiple physical links are used to provide a combination of trunking and link aggregation. A trunking F_Port channel is referred to as a TF_Port channel.

By way of example, two VSANs are implemented in the SAN 100, referred to as VSAN1 and VSAN2. Links carrying traffic of VSAN1 are depicted by solid lines, and links carrying traffic on VSAN2 are depicted by dashed lines (note some links support trunking and carry both VSAN1 and VSAN2 traffic). TN_Ports of the host 114 are respectively coupled to TF_Ports of the core switch 104. In particular, the host 114 includes two TN_Ports 122 and 124. The core switch 104 includes two TF_Ports 126 and 128. The TN_Port 124 is coupled to the TF_Port 126, and the TF_Port 122 is coupled to the TF_Port 128. Thus, there are two TN_Port-TF_Port physical links between the host 114 and the core switch 104. The two TN_Port-TF_Port physical links implement a TF_Port channel 130 between the host 114 and the core switch 104. For purposes of clarity by example, the TF_Port channel 130 is implemented using two physical links. In general, the TF_Port channel 130 may be implemented using a plurality of physical links.

A trunking E_Port of the core switch 104 is coupled to a trunking E_Port on the core switch 106. An F_Port of the core switch 104 is coupled to an N_Port of the storage device 120. Alternatively, the F_Port-N_Port link between the core switch 104 and the storage device 120 may be a TF_Port-TN_Port link. An F_Port of the core switch 106 is coupled to an N_Port of the storage device 116. Alternatively, the F_Port-N_Port link between the core switch 106 and the storage device 116 may be a TF_Port-TN_Port link. TF_ports of the core switch 106 are respectively coupled to TN_Ports of the storage device 118. Communication between the core switch 106 and the storage device 118 is similar to the TF_Port channel between the hosts 114 and the core switch 104. Namely, there are two physical links between the core switch 106 and the storage device 118, which are aggregated to implement a TF_Port channel. In general, the TF_Port channel between the core switch 106 and the storage device 118 may be implemented using a plurality of physical links.

An N_Port on the host 110 is coupled to an F_Port on the NPV switch 108. Likewise, an N_Port on the host 112 is coupled to another F_Port on the NPV switch 108. While the hosts 110 and 112 are described as having N_Ports, the hosts 110 and 112 may instead include TN_Ports, which may effectively function as N_Ports in cases where trunking is not employed. Likewise, while the NPV switch 108 is described as being coupled to the hosts 110 and 112 using F_Ports, the NPV switch 108 may be so coupled using TF_Ports. TN_Ports on the NPV switch 108 are respectively coupled to TF_Ports on the core switch 104 (e.g., two TN_Port-TF_Port links are shown). The TN_Port-TF_Port links between the NPV switch 108 and the core switch 104 implement a TF_Port channel. In general, the TF_Port channel between the NPV switch 108 and the core switch 104 may be implemented using a plurality of physical links.

N-port ID virtualization (NPIV) allows a single physical node to login to the fabric 102 using multiple IDs, which fabric 102 treats as virtual FC nodes. In the SAN 100, a device ID can be in the format of a world wide name (WWN). Using NPIV, virtual WWN's can be assigned to virtual machines running on a host. Alternatively, the virtual WWN's can be identifiers for real nodes connected to an NPIV proxy device. In SAN 100, the NPV switch 108 functions as an NPIV proxy for the hosts 110 and 112. NPIV proxy devices are one example in which a node has multiple physical node-fabric port links, which are referred to as uplinks. Conventionally, uplinks function as individual connections between N_Ports and F_Ports that support NPIV. In accordance with aspects of the invention, uplinks may be implemented over a TF_Port channel, such as the TF_Port channel between the NPV switch 108 and the core switch 104, which allows uplinks to share bandwidth and provides for uplink fault tolerance.

Figure 2:
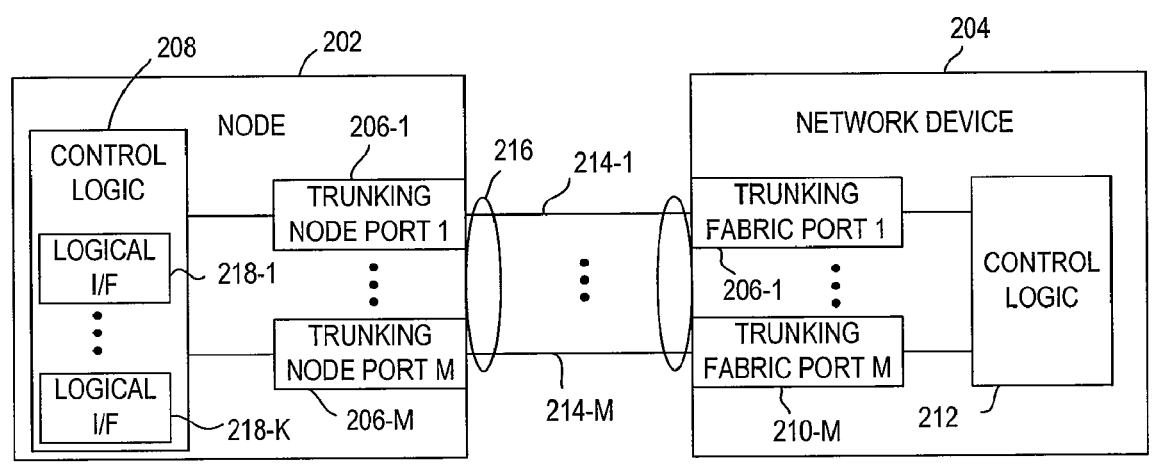
FIG. 2 is a block diagram depicting a functional model of a trunking port channel according to some embodiments of the invention.

FIG. 2 is a block diagram depicting a functional model 200 of a trunking port channel according to some embodiments of the invention. The model 200 includes a node 202 connected to a network device 204. The node 202 includes trunking node ports 206-1 through 206-M (collectively trunking node ports 206) and control logic 208. The network device 204 includes trunking fabric ports 210-1 through 210-M (collectively trunking fabric ports 210) and control logic 212. In FIG. 2, "M" is an integer greater than one. The network device 204 can be part of an FC fabric and is generally defined as any device on one side of a connection that includes fabric ports, e.g., a core switch. The network device 204 may be referred to as an "FC network device". The node 202 is a device configured for communication with an FC fabric and is generally defined as any device on one side of a connection that includes node ports, e.g., a host computer, storage device, NPV switch, or the like. There are various implementations of the model 200, including the connection between the host 114 and the core switch 104, the connection between the storage device 118 and the core switch 106, and the connection between the NPV switch 108 and the core switch 104 shown above in FIG. 1. Examples of trunking node ports include TN_Ports, and examples of trunking fabric ports include TF_Ports, as set forth above.

The trunking node ports 206-1 through 206-M are physically connected to the trunking fabric ports 210-1 through 210-M. The control logic 208 and the control logic 212 are configured to negotiate links 214-1 through 214-M (collectively referred to as links 214) between the trunking node ports 206 and the trunking fabric ports 210. Links 214 are "physical links" in that there is one link per connection between the trunking node ports 206 and the trunking fabric ports 210. As noted below, a link may support one or more virtual links. The control logic 208 and the control logic 212 are further configured to negotiate a trunking port channel 216 between the node 202 and the network device 204. The trunking port channel 216 includes as members the links 214. The members of the trunking port channel 216, e.g., the links 214, are aggregated in the trunking port channel 216 to effectively form a single link.

The trunking node ports 206 and the trunking fabric ports 210 are configured to process tagged frames. For example, the tagged frames may comprise EISL or ELS formatted frames. Tagged frames are "tagged" with a particular virtual fabric identifier so as to distinguish traffic among different virtual fabrics (e.g., different VSANs). Each of the links 214 is enabled for carrying tagged frames. Further, the trunking port channel 216 supports a plurality of allowed virtual fabrics. The control logic 208 communicates with the control logic 212 to log in logical interfaces 218-1 through 218-K (collectively logical interfaces 218) for the allowed virtual fabrics of the trunking port channel 216. In FIG. 2, "K" denotes an integer greater than one. In a SAN, the logical interfaces 218 correspond to VSAN interfaces, which are identified by logical port WWNs (PWWNs).

In some embodiments, the various negotiations between the control logic 208 and the control logic 204 are performed using Exchange Peer Parameter (EPP) protocol. EPP is a two-phase protocol in which: (1) information is exchanged about peer port configurations of interest (e.g., trunking node-trunking fabric port pairs); and (2) results of the exchange of information are applied to the peer ports, as needed. The first phase is referred to as a "SYNC" phase and the second phase is referred to as a "COMMIT" phase. EPP is described generally in U.S. Pat. No. 7,433,326, issued Oct. 7, 2008, entitled "METHODS AND DEVICES FOR EXCHANGING PEER PARAMETERS BETWEEN NETWORK DEVICES," and incorporated by reference herein. EPP is but one example of a communication protocol that can be used by the control logics 208 and 212 to implement the trunking port channel 216. Generally, the communication protocol need not be a two-phase protocol; some single-phase protocols may be employed. As an example, the existing FC SW-ILS definition in Fibre Channel can be employed, which is a request-response based protocol with delivery acknowledgement. Exemplary negations using EPP are described below.

Generally, the control logics 208 and 212 may be implemented using hardware or a combination of hardware and software. For example, the control logics 208 and 212 can be implemented in an operating system on a computer, a separate software process on a computer, a library package bound into network applications on a computer, on a specifically constructed machine, or on a network interface card. A generalized architecture that can be used to implement the control logics 208 and 212 is described below.

Figure 3:
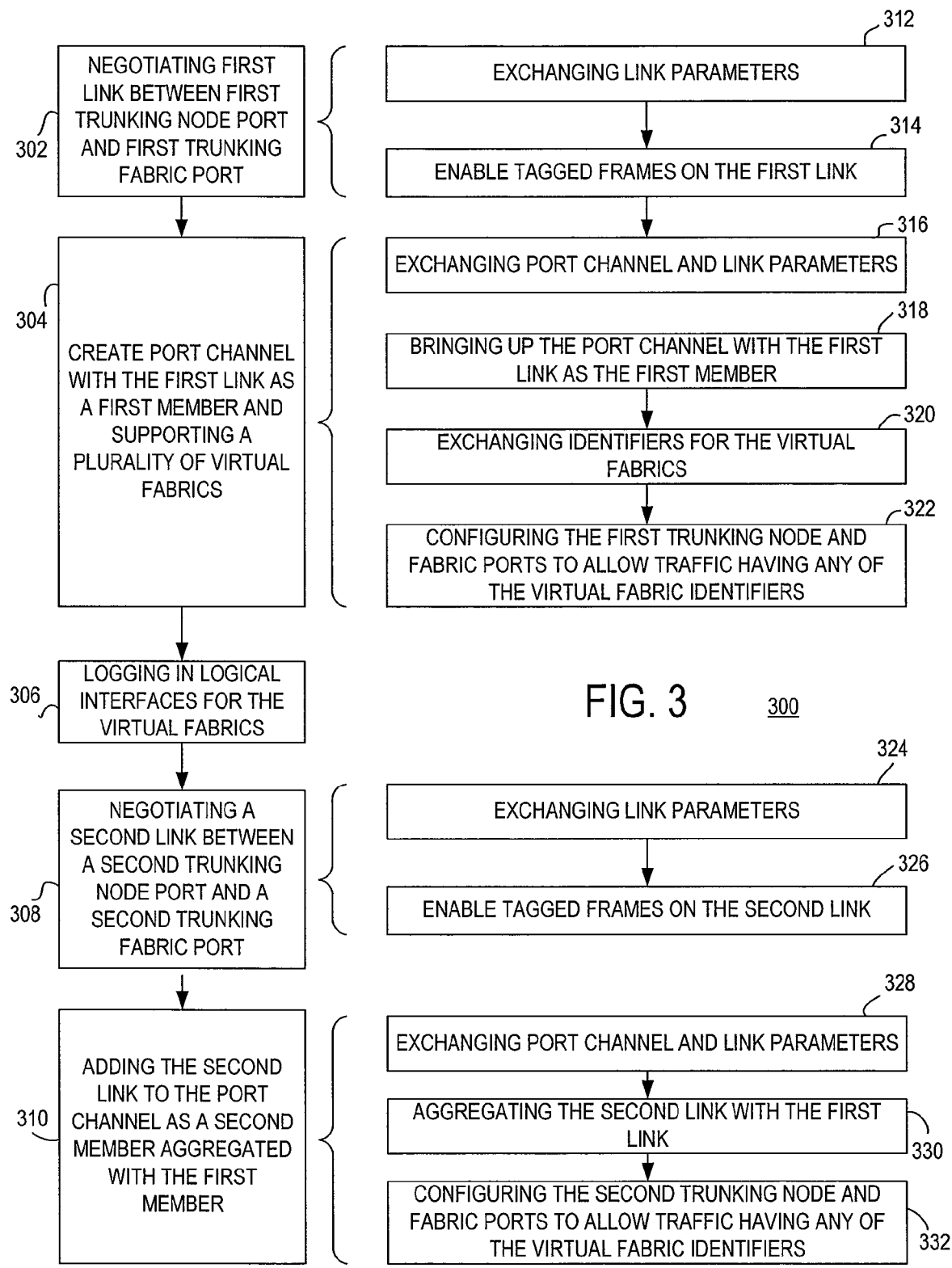
FIG. 3 is a flow diagram depicting a method of establishing a connection between a node and an FC fabric according to some embodiments of the invention.

FIG. 3 is a flow diagram depicting a method 300 of establishing a connection between a node and an FC fabric according to some embodiments of the invention. The method 300 may be performed by the control logics 208 and 212 described above. For purposes of clarity by example, the method 300 refers to the creation of a trunking port channel having two links. The method 300 begins at step 302, where a first link is negotiated between a first trunking node port and a first trunking fabric port. At step 304, a trunking port channel is created with the first link as a first member. The trunking port channel is configured to support a plurality of virtual fabrics. At step 306, logical interfaces for the virtual fabrics are logged into the FC fabric. At step 308, a second link between a second trunking node port and a second trunking fabric port is negotiated. At step 310, the second link is added to the trunking port channel as a second member aggregated with the first member. It is to be understood that after the port channel is created with the first link, any number of additional links may be aggregated with the first link in the trunking port channel.

In some embodiments, step 302 performs the following: At step 312, link parameters are exchanged between the first trunking node port and the first trunking fabric port. Exemplary link parameters include port identifiers, port capabilities, protocols to be used, etc. At step 314, the first link is enabled for tagged frames based on the link parameters (i.e., the first link is enabled for trunking). Specific embodiments of steps 312 and 314 with respect to a SAN are described below. Notably, the steps 312 and 314 may be implemented using the parameter exchange and application phases of EPP protocol, respectively.

In some embodiments, step 304 performs the following: At step 316, port channel and link parameters are exchanged between the first trunking node port and the first trunking fabric node port. Exemplary port channel parameters include port channel identifiers, command identifiers, status identifiers, etc. At step 318, the trunking port channel is brought up with the first link as the first member. At step 320, identifiers for the virtual fabrics are exchanged between the first trunking node port and the first trunking fabric port. At step 322, the first trunking node port and the first trunking fabric port are configured to allow traffic having any of the virtual fabric identifiers. Specific embodiments of steps 316 through 322 with respect to a SAN are described below. Notably, the steps 316 and 318 may be implemented using the parameter exchange and application phases of EPP protocol, respectively, for bringing up the trunking port channel. The steps 320 and 322 may be implemented using the parameter exchange and application phases of EPP protocol, respectively, for configuring the trunking port channel with a list of allowed virtual fabrics (e.g., VSANs).

In some embodiments, step 308 performs the following: At step 324, link parameters are exchanged between the second trunking node port and the second trunking fabric port. At step 326, the second link is enabled for tagged frames based on the link parameters (i.e., the second link is enabled for trunking). Specific embodiments of steps 324 and 326 with respect to a SAN are described below. Notably, the steps 324 and 326 may be implemented using the parameter exchange and application phases of EPP protocol, respectively.

In some embodiments, step 310 performs the following: At step 328, port channel and link parameters are exchanged between the second trunking node port and the second trunking fabric node port. At step 330, the second link is aggregated with the first link in the port channel. At step 332, the second trunking node port and the second trunking fabric port are configured to allow traffic having any of the virtual fabric identifiers. Specific embodiments of steps 328 through 332 with respect to a SAN are described below. Notably, the steps 328 and 330 may be implemented using the parameter exchange phase of EPP protocol, and step 332 may be implemented using the parameter application phase of EPP protocol, in order to add the second link to the trunking port channel.

Figure 4:
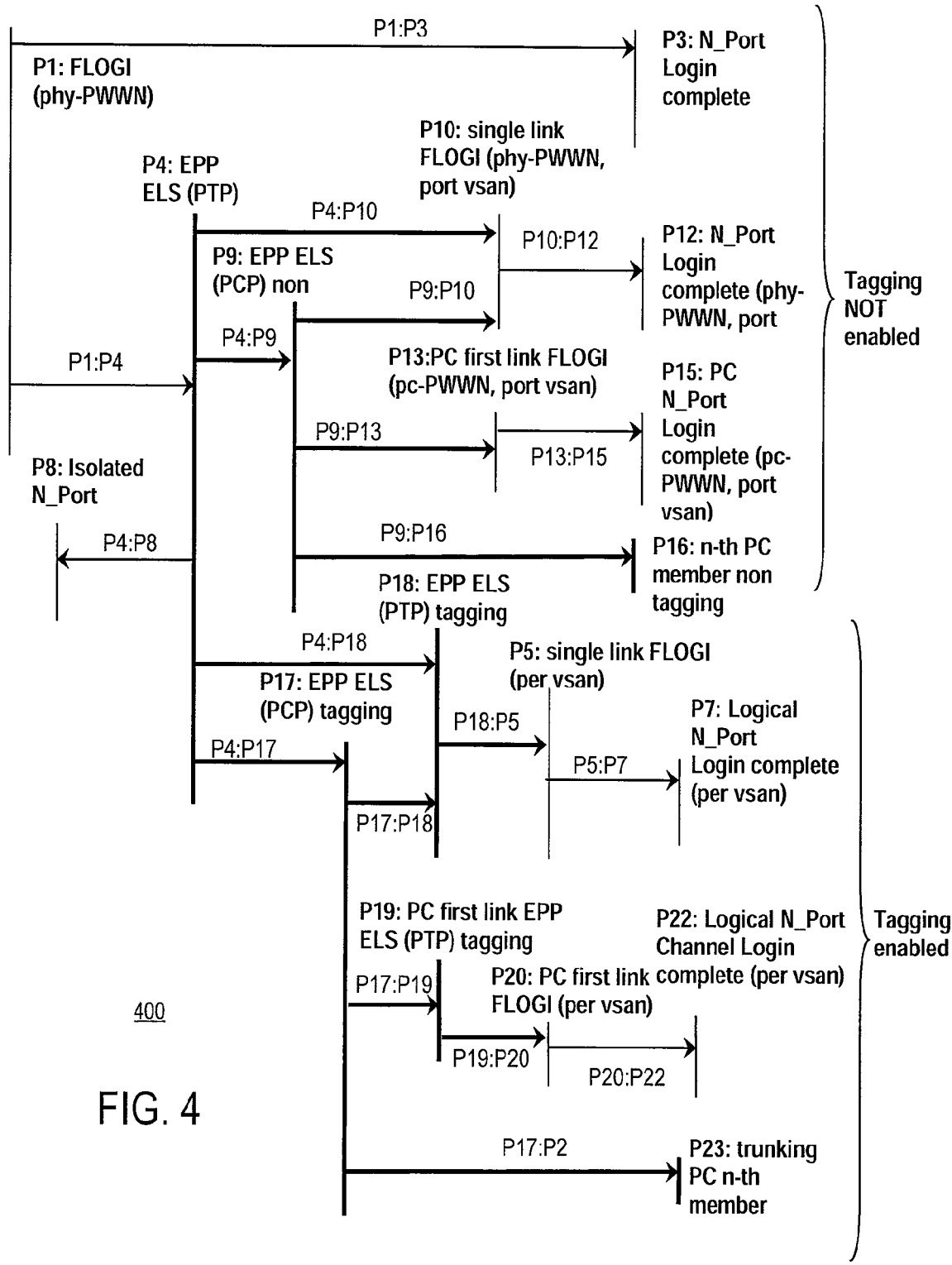
FIG. 4 is a state diagram for a node and a network device during bring-up of a trunking port channel according to some embodiments of the invention.

FIG. 4 is a state diagram 400 for the host 114 and the core switch 104 of FIG. 1 during bring-up of the TF_Port channel 130 according to some embodiments of the invention. The state diagram 400 is applicable to both initializing the TF_Port channel 130 with a first link, e.g., the link between the TN_Port 124 and the TF_Port 126, as well as to adding a second link to the TF_Port channel 130, e.g., the link between TN_Port 122 and TF_Port 128. Accordingly, the state diagram 400 generally refers to the TN_Port and the TF_Port, which may be either of the TF_Ports 122 or 124 and TF_Ports 126 or 128, respectively.

At state P1, the TN_Port performs a physical login (FLOGI) using the physical PWWN associated with the port VSAN. For acknowledgement, the TF_Port uses the Fabric_Name associated with the port VSAN. The TN_Port and the TF_Port exchange their capabilities through the common service parameters. One capability is the support of the EPP protocol. If both the TN_Port and the TF_Port support the EPP protocol, the TF_Port does not assign an FC identifier (FC_ID) to the TN_Port yet.

For state transition P1:P3, one or both of the TN_Port and the TF_Port does not support EPP protocol. Thus, the TF_Port has processed the FLOGI request according to the conventional standard behavior and has assigned an FC_ID to the TN_Port. At state P3, the TN_Port can now send data traffic, but tagging is not enabled on the link and the EPP protocol is not active. The TN_Port can perform more virtual logins following the NPIV standard.

For state transition P1:P4, both of the TN_Port and the TF_Port support EPP protocol. At state P4, the TN_Port initiates a port tagging protocol (PTP) to determine whether tagging should be enabled on the link. The TN_Port and the TF_port exchange an empty allowed VSAN list (the allowed VSAN list will be configured for the TF_Port channel, described below). As part of the PTP protocol, the TN_Port also informs the TF_Port if it is configured as part of a port channel. The TF_Port provides the same information to the TN_Port.

For state transition P4:P8, PTP has determined that the operational tagging mode is off and the TN_Port and TF_Port have different port VSANs. As such, the TN_Port and the TF_Port are taken offline. That is, if the ports are not configured for trunking, and they accept different VSANs (e.g., VSAN1 versus VSAN2), then they ports cannot be connected. At state P8, the link is isolated.

For state transition P4:P9, both the TN_Port and the TF_Port are members of a port channel, but tagging has not been enabled on the link. At state P9, the link is not tagging and the two ports are configured in the same port VSAN. A port channel protocol (PCP) is executed to form a new port channel or to join an existing port channel.

For state transition P4:P10, the TN_port and the TF_Port are not members of a port channel and tagging has not been enabled on the link. For state transition P9:P10, the link cannot form or join a new port channel. At state P10, the TN_Port does FLOGI as a single link with the physical PWWN, since the link did not form or join a port channel. The frames are not tagged, but the TN_Port and the TF_Port have agreed on the port VSAN.

For state transition P10:P12, the login was successful. At state P12, the physical TN_Port is logged in on the port VSAN. Tagging is not enabled on the link. The two ports can initiate the EPP protocol as needed, since both ports support EPP. NPIV is also supported.

For state transition P4:P17, both the TN_Port and the TF_Port are members of a port channel and tagging has been enabled on the link. At state P17, tagging has been enabled in state P4. PCP is executed on a control VSAN (e.g., dedicated ID of 4094).

For state transition P4:P18, the TN_Port and the TF_port are not members of a port channel, but tagging has been enabled on the link and the control VSAN has been allowed. At state P18, the link is not a port channel member. PTP is executed again on the control VSAN to exchange the list of allowed VSANs and enable the common VSANs between the ports on both sides.

For state transition P18:P5, the common set of allowed VSANs have been enabled on the link and the VSAN set is not empty. At state P5, trunking has been enabled on the link. For each allowed VSAN K, the TN_Port does a logical FLOGI on VSAN K using the PWWN associated with the VSAN K. The PWWN associated with the VSAN K is unique across all VSANs. The TF_Port logs in the logical PWWN in VSAN K and assignes an FC_ID thereto.

State transition P5:P7 occurs per VSAN K. The logical FLOGI for a given VSAN K is successful and the TF_Port has assigned an FC_ID to the logical PWWN. At state P7, the TN_Port can transmit and receive data frames. The TN_Port can request more FC_IDs for virtual nodes using NPIV. The TN_Port and the TF_Port can initiate EPP any time to apply a configuration change. The EPP protocol runs on the control VSAN (4094).

For state transition P9:P13, the link is the first operational member of a non-tagging port channel. At state P13, the link has formed a new port channel without tagging. The port channel does FLOGI on the port VSAN (which was agreed upon in state P4). The PWWN is the port channel PWWN. The link is the first member of the port channel. The EPP protocol is executed on the link on the port VSAN.

For state transition P13:P15, the port channel has been logged in. At state P15, the new port channel has formed without tagging. The port channel PWWN can transmit and receive data frames. The TN_Port and TF_Port can execute the EPP protocol at any time to apply configuration changes or add and remove port channel members. NPIV is also supported to request more FC_IDs for virtual N_Ports.

For state transition P9:P16, the link has joined an already operational port channel. At state P16, the link is part of an existing port channel and tagging is not enabled.

For state transition P17:P18, the link has not joined a port channel or brought up a new port channel. The link will operate as a single link. State P18 is described above.

For state transition P17:P19, the link is the first operational link of a trunking port channel. Only the control VSAN is allowed on the trunking port channel. A second PTP instance will be executed on the trunking port channel to determine the allowed VSAN list.

For state transition P17:P23, the link has joined an existing trunking port channel. In this case, the hardware configuration controlled by the EPP COMMIT frames involves both the channeling and the tagging hardware: (1) the trunking port channel hardware to make this link a member of the port channel; (2) the tagging hardware to program the allowed VSAN list of the trunking port channel on this new member. At the end of the PCP exchange, the link is ready to carry data frames at the port channel level. At state P23, the link has joined a trunking port channel that is already brought up.

At state P19, the link is the first operational link of a new trunking port channel. PTP is executed at the port channel level in the control VSAN (4094) to exchange the allowed VSAN list. At state transition P19:P20, PTP has been completed without errors and the allowed VSAN list is not empty. At state P20, for every VSAN K, the trunking port channel does logical FLOGI on VSAN K with the logical PWWN associated with the VSAN K. At state transition P20:P22, the logical FLOGI is successful for VSAN K. At state P22, a logical PWWN can now transmit and receive data frames. The TN_Port can request more FC_IDs for virtual PWWNs using NPIV.

Figure 5:
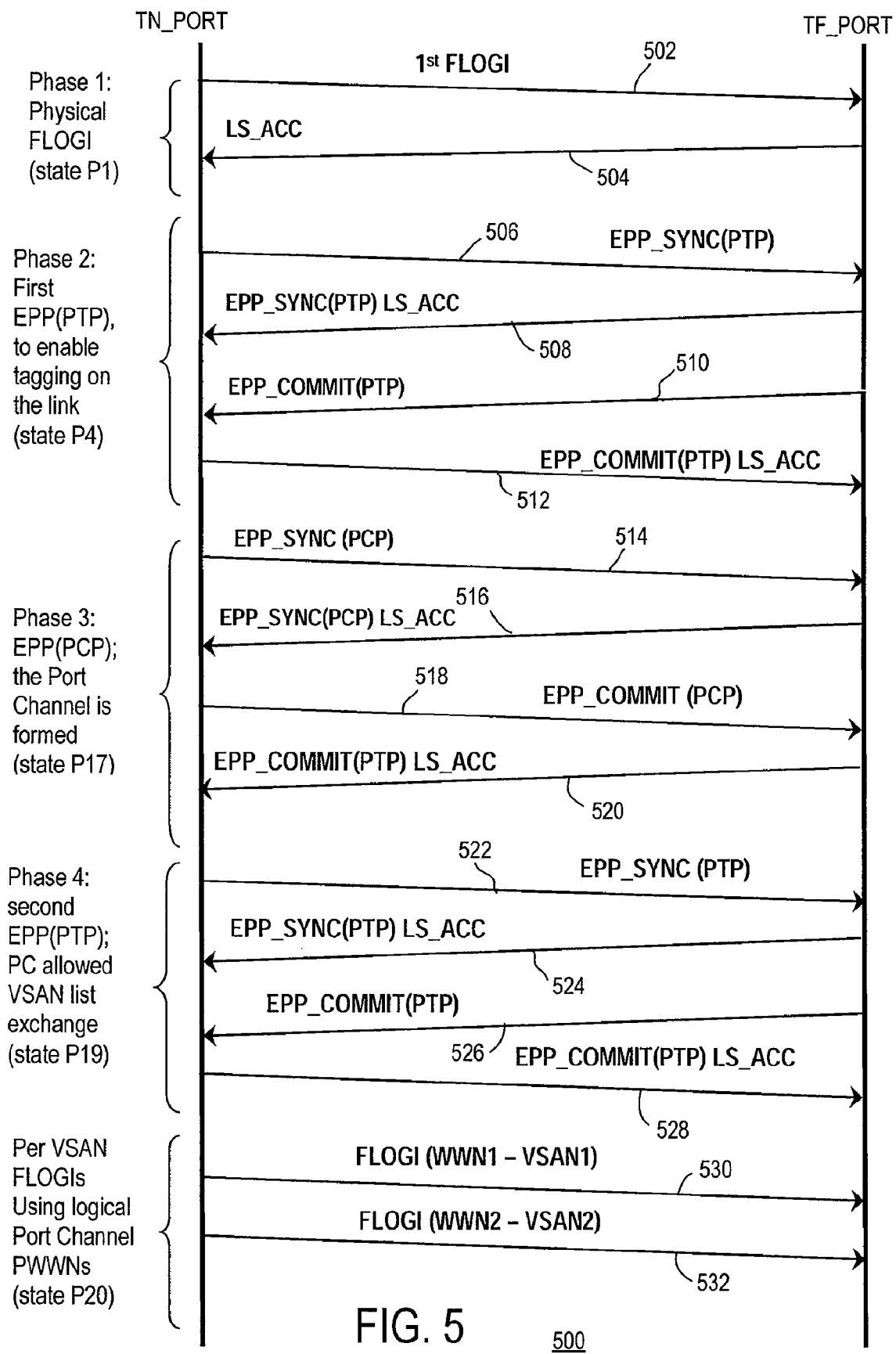
FIG. 5 is a diagram depicting interaction between a trunking N_Port and a trunking F_Port according to some embodiments of the invention.

FIG. 5 is a diagram depicting interaction between the TN_Port 124 and the TF_Port 126 as shown in FIG. 1 according to some embodiments of the invention. Interactions between the TN_Port 124 and the TF_Port 126 are depicted as diagonal lines. The interactions are the result of the states and transitions described above in FIG. 4. Assume the TF_Port channel 130 has yet to be initialized and that the link between the TN_Port 124 and the TF_Port 126 is the first link to be established. In general, the bring-up sequence of the first link of a TF_Port channel includes five phases: (1) physical login to the FC fabric 102 (FLOGI); (2) a first EPP exchange using PTP to enable tagging on the current link; (3) a second EPP exchange using PCP to create the TF_Port channel with the current link as the first member; (4) a third EPP exchange using PTP on the port channel level to program the operational allowed VSAN list on the TF_Port channel; and (5) logical FLOGI for each VSAN. In the fifth phase, each logical PWWN acquires an FC_ID.

The process begins with the TN_Port 124 requesting a physical FLOGI using the PWWN for the port VSAN (502). The TF_Port 126 responds with an acknowledgement and indicates that EPP is supported (504). Steps 502 and 504 complete phase one of the bring-up sequence.

To begin phase two, the TN_Port 124 initiates PTP by sending an EPP SYNC frame to the TF_Port 126 (506). The TF_Port 126 responds by sending an EPP SYNC frame to the TN_Port 124 (508). The EPP SYNC frames provide for an exchange of parameters that indicate tagging is supported on the link, provide port identifiers, and indicate that link aggregation is requested. The TF_Port 126 then sends an EPP COMMIT frame to the TN_Port 124 to enable tagging on the link (510). The TN_Port 124 responds with an EPP COMMIT frame to acknowledge that tagging is enabled on the link (512). Steps 506 through 512 represent the PTP process and complete phase two of the bring-up sequence.

To begin phase three, the TN_Port 124 initiates PCP by sending an EPP SYNC frame to the TF_Port 126 (514). The TF_Port 126 returns an EPP SYNC frame to the TN_Port 124 in acknowledgement (516). The EPP SYNC frames exchange parameters for configuring the TF_Port channel 130, such as a command identifier, port identifiers, an identifier for the TF_Port channel 130, and the like. The TN_Port 124 sends an EPP COMMIT frame to the TF_Port 126 (518). The TF_Port 126 responds with an EPP COMMIT frame to the TN_Port 124 (520). The EPP COMMIT frames enable bring-up of the TF_Port channel 130 having the link between the TN_Port 124 and the TF_Port 126 as the first member. Steps 514 through 520 represent the PCP process and completes phase three of the bring-up sequence.

To begin phase four, the TN_Port 124 initiates PTP for the TF_Port channel 130 by sending an EPP SYNC frame to the TF_Port 126 (522). The TF_Port 126 returns an EPP SYNC frame to the TN_Port 124 in acknowledgement (524). The EPP SYNC frames exchange parameters that indicate tagging is supported on the port channel along with a list of allowed VSAN identifiers. The TF_Port 126 then sends an EPP COMMIT frame to the TN_Port 124 (526). The TN_Port 124 sends EPP COMMIT frame to the TF_Port 126 in acknowledgement (528). The EPP COMMIT frames enable tagging on the TF_Port channel and configuring the TF_Port channel with allowed VSANs. Steps 522 through 528 represent the PTP process on the port channel level and completes phase four of the bring-up sequence.

To begin phase five, the TN_Port 124 sends a logical FLOGI to the TF_Port 126 with an identifier for the VSAN1 on the TF_Port channel 130 (530). The TF_Port 126 sends an acknowledgement to the TN_Port 124 (532). The TN_Port 124 then sends a logical FLOGI to the TF_Port 126 with an identifier for the VSAN2 on the TF_Port channel 130 (534). The TF_Port 126 sends an acknowledgement to the TN_Port 124 (536). In this manner, the TF_Port channel 130 is created with the link between the TN_Port 124 and the TF_Port 126 as the first member and with VSAN1 and VSAN2 as allowable VSANs for trunking. Each logical identifier for VSAN1 and VSAN2 (PWWNs) is assigned an FC_ID.

Figure 6:
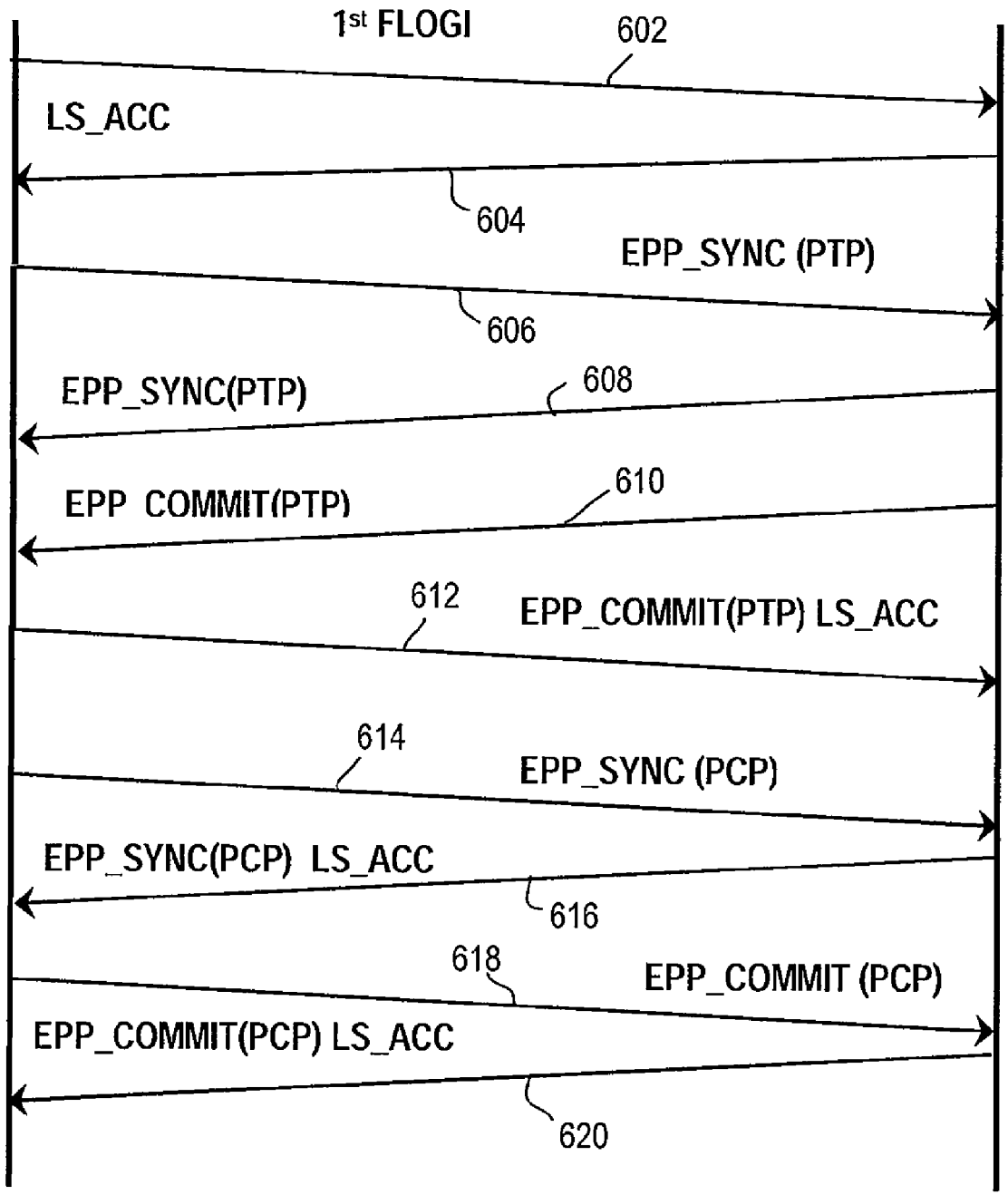
FIG. 6 is a diagram depicting another interaction between a trunking N_Port and a trunking F_Port according to some embodiments of the invention.

FIG. 6 is a diagram depicting interaction between the TN_Port 122 and the TF_Port 128 as shown in FIG. 1 according to some embodiments of the invention. Interactions between the TN_Port 122 and the TF_Port 128 are depicted as diagonal lines. The interactions are the result of the states and transitions described above in FIG. 4. Assume the TF_Port channel 130 has been initialized and that the link between the TN_Port 124 and the TF_Port 126 is the first member. In general, the addition of another link to the TF_Port channel includes three phases: (1) physical FLOGI; (2) a first EPP exchange using PTP to enable tagging on the current link; and (3) a second EPP exchange using PCP to add the current link to the TF_Port channel and to program the operational allowed VSAN list.

The process begins with the TN_Port 122 requesting a physical FLOGI using the PWWN for the TN_Port 122 (602). The TF_Port 128 responds with an acknowledgement and indicates that EPP is supported (604). Steps 502 and 504 complete phase one of the link addition sequence.

To begin phase two, the TN_Port 122 initiates PTP by sending an EPP SYNC frame to the TF_Port 128 (606). The TF_Port 128 responds by sending an EPP SYNC frame to the TN_Port 122 (608). The EPP SYNC frames provide for an exchange of parameters that indicate tagging is supported on the link, provide port identifiers, and indicate that link aggregation is requested. The TF_Port 128 then sends an EPP COMMIT frame to the TN_Port 122 to enable tagging on the link (610). The TN_Port 122 responds with an EPP COMMIT frame to acknowledge that tagging is enabled on the link (612). Steps 606 through 612 represent the PTP process and complete phase two of the link addition sequence.

To begin phase three, the TN_Port 122 initiates PCP by sending an EPP SYNC frame to the TF_Port 128 (614). The TF_Port 128 returns an EPP SYNC frame to the TN_Port 122 in acknowledgement (616). The EPP SYNC frames exchange parameters for configuring the TF_Port channel 130, such as a command identifier, port identifiers, an identifier for the TF_Port channel 130, and the like. The TN_Port 122 sends an EPP COMMIT frame to the TF_Port 128 (618). The TF_Port 128 responds with an EPP COMMIT frame to the TN_Port 122 (620). The EPP COMMIT frames enable the addition to the TF_Port channel 130 of the link between the TN_Port 122 and the TF_Port 128. Further, the COMMIT frames configure the TN_Port 122 and the TF_Port 128 with the allowed VSANs. Steps 614 through 620 represent the PCP process and completes phase three of the link addition sequence. In this manner, the link between the TN_Port 122 and the TF_Port 128 is aggregated with the link between the TN_Port 124 and the TF_Port 126 in the TF_Port channel 130. VSAN1 and VSAN2 as configured as allowable VSANs for trunking.

Figure 7:
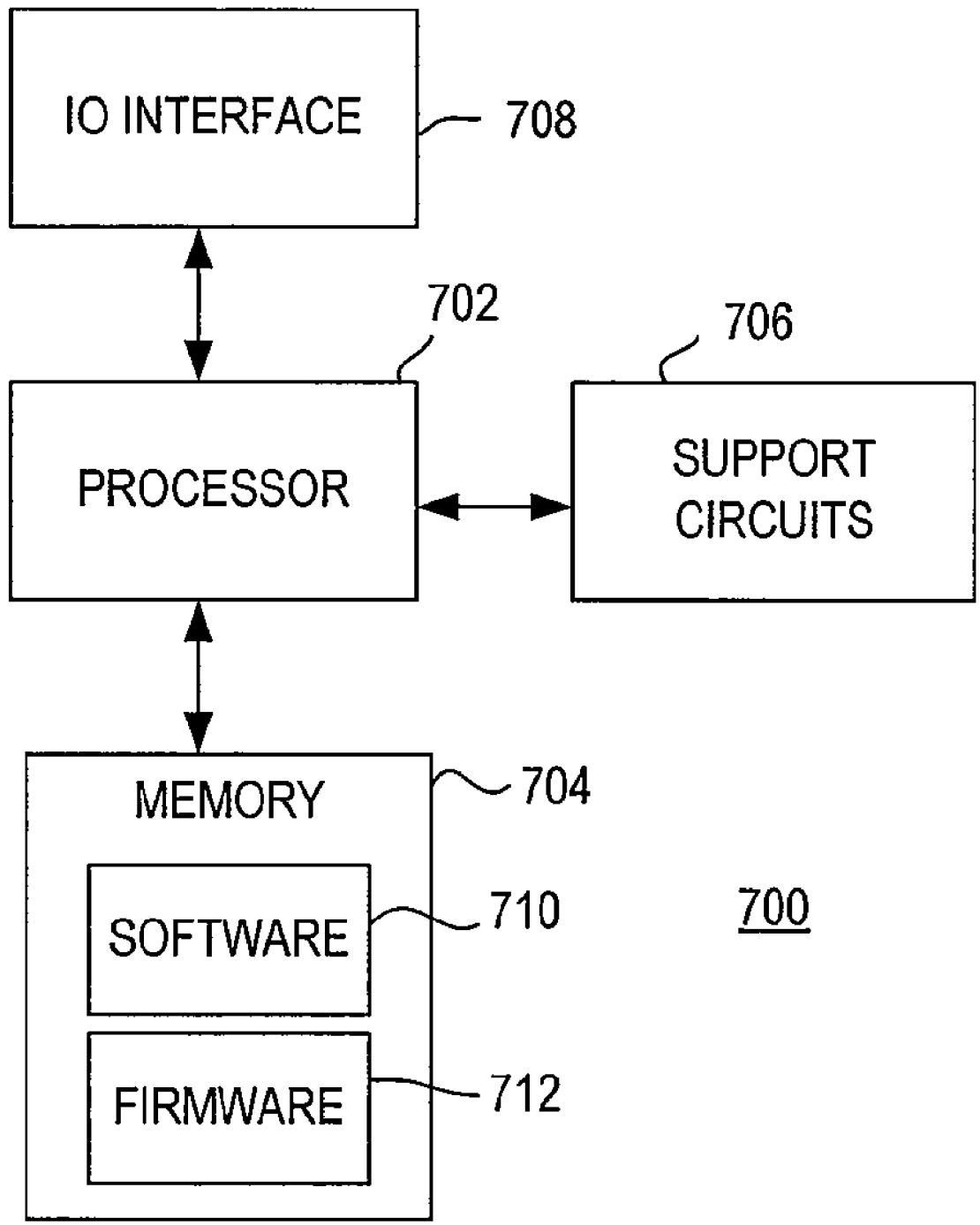
FIG. 7 is a block diagram depicting hardware suitable for implementing the techniques of the present invention.

FIG. 7 is a block diagram depicting hardware 700 suitable for implementing the techniques of the present invention. For example, the hardware 700 may be used to implement the control logic in each node or network device described above (e.g., the control logic 208 and the control logic 212). The hardware 700 illustratively includes a processor 702, a memory 704, various support circuits 706, and an input/output (IO) interface 708. The processor 702 may include one or more microprocessors, microcontrollers, instruction-set processors, and the like known in the art. The support circuits 706 for the processor 702 include conventional cache, power supplies, clock circuits, data registers, I/O interfaces, and the like. The I/O interface 708 may be configured for communication with various devices, such as FC ports (e.g., node ports, fabric ports, etc.). The memory 704 may include one or more of the following random access memory, read only memory, magneto-resistive read/write memory, optical read/write memory, cache memory, magnetic read/write memory, and the like. The memory 704 may store software 710 and/or firmware 712.

When acting under control of the software 710 and/or the firmware 712, the processor 702 may be responsible for implementing specific functions associated with the functions of a desired network device or node. For example, the processor 702 may be responsible for analyzing frames, encapsulating frames, forwarding frames, and performing various actions in response to frames to achieve the various techniques described above. In particular, the processor 702 may be responsible for performing one or more steps shown in FIG. 3, implement a state machine according to the state diagram shown in FIG. 4, and performing one or more steps shown in FIGS. 5 and 6.

Aspects of the techniques described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

Trunking with port aggregation for fabric ports in a Fibre Channel fabric and attached devices has been described. Without trunking and link aggregation between node ports and fabric ports, the following limitations may apply:

1. An FC node that is connected to the same fabric with two of more fabric ports cannot use all the links at the same time, unless ad-hoc, special purpose software is running on the node;
2. On NPIV nodes, a link failure on one of the uplink ports is potentially disruptive for all the virtual nodes assigned to that uplink; the virtual nodes have to login again in order to be assigned to a different uplink; this can cause a service interruption and potentially a change in the FC-ID assigned to the virtual nodes;
3. On NPIV nodes, the bandwidth utilization of the uplinks is not optimal, depending on the sequence of login and logout events; to rebalance the virtual nodes across the uplinks, the virtual nodes have to be logged out of the fabric and logged in again; this can cause a service interruption and potentially a change in the FC-ID assigned to the virtual nodes;
4. On NPIV nodes, in case there are less virtual nodes than uplinks, each virtual node is still limited to the bandwidth of a single uplink;
5. The NPIV node itself uses a wwn to access the fabric and interact with the management applications; given the limitations of NPIV, the node needs to login a different wwn for each uplink and has to be able to switch between them as the uplinks are brought up and down.

A trunking port channel of links between fabric ports and node ports abstracts the physical link from the node, with the following benefits:

1. An FC node can be connected to the fabric by more than one link using all the available bandwidth and logging into the fabric with a single wwn; there is no service interruption in case of link failure;

2. For NPIV nodes, single link failures on the uplinks are no longer disruptive for the virtual nodes that are logged into the fabric;
3. For NPIV nodes, at any point in time the cumulative available uplink bandwidth is shared among all nodes; the order in which the nodes log in and out of the fabric cannot cause an unfair allocation of bandwidth;
4. The management of the NPIV node itself is simpler in that it can retain the same FC-ID no matter which and how many uplinks are available;
5. Software running on a virtual machine running on an under-subscribed NPIV node will have access to more bandwidth than if it was installed on a physical computer, without any change to the FC drivers in the operating system;
6. Since trunking is supported across the aggregated channel, it is not necessary to deploy multiple port channels to carry traffic on more than one VSAN; and
7. The support of trunking also guarantees the best utilization of the aggregate bandwidth across the VSANs in use.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   establishing a first link between a first trunking node port in a node with a first trunking fabric port in a Fiber Channel (FC) fabric by sending a login request from the node to the FC fabric and receiving a message comprising information indicating that the login request was accepted;
   creating a trunking port channel with the first link as a first member using a port channel protocol, the trunking port channel supporting a plurality of virtual fabrics;
   enabling the first link to carry tagged frames using a port tagging protocol, the tagged frames being tagged with a particular virtual fabric identifier so as to distinguish traffic among different virtual fabrics;
   exchanging a list of identifiers for allowed virtual fabrics between the first trunking node port and the first trunking fabric port;
   logging in a logical interface for each of the allowed virtual fabrics to the FC fabric over the trunking port channel;
   establishing a second link between a second trunking node port in the node with a second trunking fabric port in the FC fabric by sending a login request from the node to the FC fabric and receiving a message comprising information indicating that the login request was accepted;
   enabling the second link to carry tagged frames using the port tagging protocol; and
   adding the second link to the trunking port channel as a second member aggregated with the first member.

2. The method of claim 1, and further comprising configuring the first trunking node port and the second trunking node port to process tagged frames, and configuring the first trunking fabric port and the second trunking fabric port is to process the tagged frames.

3. The method of claim 2, wherein the tagged frames comprise extended inter-switch link (EISL) formatted frames or extended link service (ELS) formatted frames.

4. The method of claim 1, wherein the establishing the first link, creating the trunking port channel, establishing the second link, and adding the second link to the trunking port channel are performed using an exchange peer parameters (EPP) protocol.

5. The method of claim 1, wherein the FC fabric is part of a storage area network (SAN), and wherein each of the plurality of virtual fabrics is a virtual SAN (VSAN).

6. The method of claim 1, wherein the establishing the first link comprises exchanging link parameters between the first trunking node port and the first trunking fabric port; and wherein enabling tagged frames on the first link is based on the link parameters.

7. The method of claim 1, wherein creating the trunking port channel comprises:
   exchanging trunking port channel parameters and link parameters between the first trunking node port and the first trunking fabric port;
   bringing up the trunking port channel based on the trunking port channel parameters with the first link as the first member based on the link parameters; and
   configuring the first trunking node port and the first fabric node port to allow traffic having any one of the identifiers for the allowed virtual fabrics.

8. The method of claim 1, wherein the establishing the second link comprises exchanging link parameters between the second trunking node port and the second trunking fabric port; and wherein enabling tagged frames on the second link is based on the link parameters.

9. The method of claim 1, wherein adding the second link to the trunking port channel comprises:
   exchanging trunking port channel parameters and link parameters between the second trunking node port and the second trunking fabric port;
   aggregating the second link as the second member with the first link as the first member on the trunking port channel based on the trunking port channel parameters and the link parameters; and
   configuring the second trunking node port and the second trunking fabric port to allow traffic having any one of the identifiers for the allowed virtual fabrics.

10. An apparatus comprising:
    a first trunking fabric port configured to accept connections from a first trunking node port of a node seeking to log into a Fiber Channel (FC) fabric;
    a second trunking fabric port configured to accept connections from a second trunking node port of the node; and
    control logic, coupled to the first trunking fabric port and the second trunking fabric port, configured to:
       establish a first link between the first trunking fabric port and the first trunking node port when a login request is received from the node;
       send a message comprising information indicating that the login request was accepted;
       create a trunking port channel with the first link as a first member using a port channel protocol, the trunking port channel supporting a plurality of virtual fabrics;
       enable the first link to carry tagged frames using a port tagging protocol, the tagged frames being tagged with a particular virtual fabric identifier so as to distinguish traffic among different virtual fabrics;
       exchange a list of identifiers for allowed virtual fabrics between the first trunking fabric port and the first trunking node port;
       log in a logical interface for each of the allowed virtual fabrics over the trunking port channel;
       establish a second link between the second trunking fabric port and the second trunking node port when a login request is received;

send a message comprising information indicating that the login request was accepted and that the second link is established;
enable the second link to carry tagged frames using the port tagging protocol; and
add the second link to the trunking port channel as a second member aggregated with the first member.

11. The apparatus of claim 10, wherein each of the first trunking node port and the second trunking node port is configured to process tagged frames, and wherein each of the first trunking fabric port and the second trunking fabric port is configured to process the tagged frames.

12. The apparatus of claim 11, wherein the tagged frames comprise extended inter-switch link (EISL) formatted frames or extended link service (ELS) formatted frames.

13. The apparatus of claim 10, wherein the control logic is configured to establish the first link, create the trunking port channel, establish the second link, and add the second link to the trunking port channel using an exchange peer parameters (EPP) protocol.

14. The apparatus of claim 10, wherein each of the plurality of virtual fabrics is a virtual storage area network (VSAN).

15. An apparatus comprising:
a first trunking node port configured to connect to a first trunking fabric port in a Fiber Channel (FC) fabric fabric;
a second trunking node port configured to connect to a second trunking fabric port in the FC fabric; and
control logic, coupled to the first trunking node port and the second trunking node port, configured to:
establish a first link between the first trunking node port with the first trunking fabric port in the FC fabric by sending a login request to the FC fabric and receiving a message comprising information indicating that the login request was accepted;
negotiate creation of a trunking port channel with the first link as a first member using a port channel protocol, the trunking port channel supporting a plurality of virtual fabrics;
enable the first link to carry tagged frames using a port tagging protocol, the tagged frames being tagged with a particular virtual fabric identifier so as to distinguish traffic among different virtual fabrics;
exchange a list of identifiers for allowed virtual fabrics between the first trunking node port and the first trunking fabric port using the port tagging protocol;
log in a logical interface for each of the allowed virtual fabrics to the FC fabric over the trunking port channel;
establish a second link between the second trunking node port with the second trunking fabric port in the FC fabric by sending a login request to the FC fabric and receiving a message comprising information indicating that the login request was accepted;
enable the second link to carry tagged frames using the port tagging protocol; and
negotiate addition of the second link to the trunking port channel as a second member aggregated with the first member.

16. The apparatus of claim 15, wherein each of the first trunking node port and the second trunking node port is configured to process tagged frames, and wherein each of the first trunking fabric port and the second trunking fabric port is configured to process the tagged frames.

17. The apparatus of claim 16, wherein the tagged frames comprise extended inter-switch link (EISL) formatted frames or extended link service (ELS) formatted frames.

18. The apparatus of claim 15, wherein the control logic is configured to establish the first link, negotiate creation of the trunking port channel, establish the second link, and negotiate addition of the second link to the trunking port channel using an exchange peer parameters (EPP) protocol.

19. The apparatus of claim 10, wherein each of the plurality of virtual fabrics is a virtual storage area network (VSAN).

20. A system comprising:
a node having a first trunking node port and a second trunking node port;
a network device in a Fiber Channel (FC) fabric, the network device having a first trunking fabric port and a second trunking fabric port;
wherein the node and the network device are configured to:
establish a first link between the first trunking fabric port and the first trunking node port;
establish a second link between the second trunking fabric port and the second trunking node port;
create a trunking port channel with the first link as a first member using a port channel protocol, the trunking port channel supporting a plurality of virtual fabrics;
enable the first and second links to carry tagged frames using a port tagging protocol, the tagged frames being tagged with a particular virtual fabric identifier so as to distinguish traffic among different virtual fabrics;
exchange a list of identifiers for allowed virtual fabrics between the first trunking node port and the first trunking fabric port;
a logical interface for each of the plurality of virtual fabrics to the FC fabric over the trunking port channel; and
add the second link to the trunking port channel as a second member aggregated with the first member so as to trunk traffic for the plurality of virtual fabrics using the trunking port channel.

* * * * *